US007555471B2

(12) United States Patent
Hogue et al.

(10) Patent No.: US 7,555,471 B2
(45) Date of Patent: Jun. 30, 2009

(54) DATA OBJECT VISUALIZATION

(75) Inventors: Andrew W. Hogue, Ho Ho Kus, NJ (US); David J. Vespe, Larchmont, NY (US); Alexander Kehlenbeck, Brooklyn, NY (US); Michael Gordon, Brooklyn, NY (US); Jeffrey C. Reynar, New York, NY (US); David B. Alpert, Hoboken, NJ (US)

(73) Assignee: Google Inc., Mountain View, CA (US)

( * ) Notice: Subject to any disclaimer, the term of this patent is extended or adjusted under 35 U.S.C. 154(b) by 252 days.

(21) Appl. No.: 11/342,290

(22) Filed: Jan. 27, 2006

(65) Prior Publication Data

US 2007/0203867 A1 Aug. 30, 2007

(51) Int. Cl.
*G06N 5/00* (2006.01)
(52) U.S. Cl. .......................................... 706/48; 706/45
(58) Field of Classification Search .................. 706/48; 707/1, 5, 101
See application file for complete search history.

(56) References Cited

U.S. PATENT DOCUMENTS

| | | | |
|---|---|---|---|
| 5,475,819 A | 12/1995 | Miller et al. | |
| 5,560,005 A | 9/1996 | Hoover et al. | |
| 5,574,898 A | 11/1996 | Leblang et al. | |
| 5,778,378 A | 7/1998 | Rubin | |
| 5,963,940 A * | 10/1999 | Liddy et al. | 707/5 |
| 6,026,388 A * | 2/2000 | Liddy et al. | 707/1 |
| 6,263,328 B1 | 7/2001 | Coden et al. | |
| 6,327,574 B1 | 12/2001 | Kramer et al. | |
| 6,377,943 B1 | 4/2002 | Jakobsson | |
| 6,606,659 B1 | 8/2003 | Hegli et al. | |
| 6,609,123 B1 | 8/2003 | Cazemier et al. | |
| 6,629,097 B1 * | 9/2003 | Keith | 707/5 |
| 7,158,983 B2 * | 1/2007 | Willse et al. | 707/101 |
| 2003/0154071 A1 | 8/2003 | Shreve | |
| 2004/0107125 A1 | 6/2004 | Guheen et al. | |
| 2004/0122844 A1 | 6/2004 | Malloy et al. | |

(Continued)

OTHER PUBLICATIONS

Brill, E. et al., "An Analysis of the AskMSR Question-Answering System," Proceedings of the Conference on Empirical Methods in Natural Language Processing (EMNLP), Jul. 2002, pp. 257-264.

(Continued)

*Primary Examiner*—Wilbert L Starks, Jr.
(74) *Attorney, Agent, or Firm*—Morgan, Lewis & Bockius LLP

(57) ABSTRACT

A fact repository stores objects. Each object includes a collection of facts, where a fact comprises an attribute and a value. A set of objects from the fact repository are designated for analysis. The presentation engine presents the facts of the objects in a user interface (UI) having a table. Through manipulation of the UI, an end-user can add or remove facts from the table, and sort the table based on the values of particular facts. The presentation engine also presents the facts of the objects in a UI having a graph. Through manipulation of the UI, the end-user can add or remove facts from the graph, and can sort the facts shown in the graph based on values that are shown, or not shown, in the graph. The presentation engine can further present the facts of the objects in UIs including maps and timelines.

37 Claims, 13 Drawing Sheets

U.S. PATENT DOCUMENTS

| | | | |
|---|---|---|---|
| 2005/0076012 | A1 | 4/2005 | Manber et al. |
| 2005/0256825 | A1 | 11/2005 | Dettinger et al. |
| 2006/0085465 | A1 | 4/2006 | Nori et al. |
| 2007/0203867 | A1 | 8/2007 | Hogue et al. |

OTHER PUBLICATIONS

Brin, S., "Extracting Patterns and Relations from the World Wide Web," 12 pages.

Chang, C. et al., "IEPAD: Information Extraction Based on Pattern Discovery," WWW10 '01, ACM, May 1-5, 2001, pp. 681-688.

Chu-Carroll, J. et al., "A Multi-Strategy with Multi-Source Approach to Question Answering," 8 pages.

Dean, J. et al., "MapReduce: Simplified Data Processing on Large Clusters," To appear in OSDI 2004, pp. 1-13.

Etzioni, O. et al., "Web-scale Information Extraction in KnowItAll (Preliminary Results)," WWW2004, ACM, May 17-20, 2004, 11 pages.

Freitag, D. et al., "Boosted Wrapper Induction," American Association for Artificial Intelligence, 2000, 7 pages.

Guha, R. et al., "Disambiguating People in Search," WWW2004, ACM, May 17-22, 2004, 9 pages.

Guha, R., "Object Co-identification on the Semantic Web," WWW2004, ACM, May 17-22, 2004, 9 pages.

Hogue, A.W., "Tree Pattern Inference and Matching for Wrapper Induction on the World Wide Web," Master of Engineering in Electrical and Computer Science, Massachusetts Institute of Technology, Jun. 2004, pp. 1-106.

"Information Entropy—Wikipedia, the free encyclopedia," [online] [Retrieved on May 3, 2006] Retrieved from the Internet<URL:http://en.wikipedia.org/wiki/Information_entropy>.

"Information Theory—Wikipedia, the free encyclopedia," [online] [Retrieved on May 3, 2006] Retrieved from the Internet<URL:http://en.wikipedia.org/wiki/Information_theory>.

Jones, R. et al., "Bootstrapping for Text Learning Tasks," 12 pages.

Kosseim, L, et al., "Answer Formulation for Question-Answering," 11 pages.

Liu, B. et al., "Mining Data Records in Web Pages," Conference '00, ACM, 2000, pp. 1-10.

McCallum, A. et al., "Object Consolodation by Graph Partitioning with a Conditionally-Trained Distance Metric," SIGKDD '03, ACM, Aug. 24-27, 2003, 6 pages.

Mihalcea, R. et al., "PageRank on Semantic Networks, with Application to Word Sense Disambiguation," 7 pages.

Mihalcea, R..et al., "TextRank: Bringing Order into Texts," 8 pages.

PCT International Search Report and Written Opinion, PCT/US06/07639, Sep. 13, 2006, 6 pages.

Prager, J. et al., "IBM's PIQUANT in TREC2003," 10 pages.

Prager, J. et al., "Question Answering using Constraint Satisfaction: QA-by-Dossier-with-Constraints," 8 pages.

Ramakrishnan, G. et al., "Is Question Answering an Acquired Skill?", WWW2004, ACM, May 17, 2004, pp. 111-120.

PCT International Search Report and Written Opinion, PCT/US07/61156, Feb. 11, 2008, 7 pages.

* cited by examiner

Example Format of Facts in Repository (each fact is associated with an object ID)

Example Facts in Repository (each fact is associated with an object ID)

Example Object
Reference Table**

Example Format of Facts in Repository (each fact is associated with an object ID)

Example Objects

| (Select field to add) ⌄ — 516 | Atomic Mass [Remove] [Sort] [Graph] | Density @ 293 K [Remove] [Sort] [Graph] | Boiling Point [Remove] [Sort] [Graph] |
|---|---|---|---|
| Actinium | (227.0) amu | 10.07 g/cm³ | 3200°C (3473.15°K, 5792.0°F) |
| Polonium | (209.0) amu | 9.4 g/cm³ | 962.0°C (1235.15°K, 1763.6°F) |
| Chromium | 51.9961 amu | 7.19 g/cm³ | 2672.0°C (2945.15°K, 4841.6°F) |
| Rhodium | 102.9055 amu | 12.41 g/cm³ | 3727.0°C (4000.15°K, 6740.6°F) |
| Cesium | 132.90546 amu | 1.873 g/cm³ | 678.4°C (951.55005°K, 1253.12°F) |
| Gallium | 69.723 amu | 5.907 g/cm³ | 2403.0°C (2676.15°K, 4357.4°F) |
| Scandium | 44.95591 amu | 2.989 g/cm³ | 2832.0°C (3105.15°K, 5129.6°F) |
| Francium | (223.0) amu | Unknown | 677.0°C (950.15°K, 1250.6°F) |
| Carbon | 12.0107 amu | 2.62 g/cm³ | 4827.0°C (5100.15°K, 8720.6°F) |
| Silver | 107.8682 amu | 10.5 g/cm³ | 2212.0°C (2485.15°K, 4013.6°F) |
| Curium | (247.0) amu | 13.511 g/cm³ | Unknown |
| Iridium | 192.217 amu | 22.57 g/cm³ | 4527.0°C (4800.15°K, 8180.6°F) |
| Sulfur | 32.066 amu | 2.07 g/cm³ | 444.6°C (717.75°K, 832.28°F) |
| Europium | 151.964 amu | 5.259 g/cm³ | 1597.0°C (1870.15°K, 2906.6°F) |
| Astatine | (210.0) amu | Unknown | 337.0°C (610.15°K, 638.6°F) |

FIG. 5

DATA OBJECT VISUALIZATION

CROSS-REFERENCE TO RELATED APPLICATIONS

This application is related to the following U.S. applications, all of which are incorporated by reference herein:

U.S. application Ser. No. 11/342,293, entitled "Data Object Visualization Using Maps", filed concurrently herewith, by Andrew W. Hogue, David Vespe, Alex Kehlenbeck, Mike Gordon, Jeffrey C. Reynar, David Alpert;

U.S. application Ser. No. 11/341,069, entitled "Object Categorization for Information Extraction", filed concurrently herewith, by Jonathan T. Betz;

U.S. application Ser. No. 11/341,907, entitled "Designating Data Objects for Analysis", filed concurrently herewith, by Andrew W. Hogue, David Vespe, Alex Kehlenbeck, Mike Gordon, Jeffrey C. Reynar, David Alpert;

U.S. application Ser. No. 11/342,277, entitled "Data Object Visualization Using Graphs", filed concurrently herewith, by Andrew W. Hogue, David Vespe, Alex Kehlenbeck, Mike Gordon, Jeffrey C. Reynar, David Alpert.

BACKGROUND OF THE INVENTION

1. Field of the Invention

This invention pertains in general to data visualization on a computer and, in particular, to ways of representing data obtained from web pages and other sources.

2. Description of the Related Art

The World Wide Web and other information storage and retrieval systems contain a great deal of information. With the advent of search engines and other similar tools it has become relatively easy for an end-user to locate particular information. For example, one can obtain a wealth of information about the atomic elements by simply searching for the terms "atomic elements" on the Web.

It is generally acknowledged that certain types of information are easier to comprehend when presented in some formats rather than in other formats. For example, an end-user might find it easier to understand the relationships between the atomic masses of the atomic elements if the masses are presented graphically instead of listed as numeric values. Similarly, trends in stock prices are easier to understand when the prices are presented on a graph rather than as a list of dates and prices.

Information on the web is not always in a format that is easy for the end-user to comprehend. A web site that describes the atomic elements might display the periodic table and provide information like the atomic weights, melting points, and densities of the elements, but the site is unlikely to provide a graph of, say, atomic weights versus melting points. As a result, a person who desires to view such a graph must manually copy the information into another program that provides graphing capabilities.

Some web sites, like sites providing stock prices and other financial information, provide limited amounts of dynamic content. For example, a person can interact with such sites to create and manipulate graphs showing stock prices over time. Even on these sites, however, the person is restricted to a limited set of graphing options. Further, there is no way for a person to graphically manipulate data contained on multiple web sites short of copying the desired information into separate graphing program.

Therefore, there is a need in the art for a way to enable the end-user to organize and view structured information on web pages in a way that makes it easier to comprehend.

BRIEF SUMMARY OF THE INVENTION

The above need is met by a system, method, and computer program product for presenting facts. In one embodiment, an object access module establishes a set of objects, each object having a set of facts, each fact having an attribute and a corresponding value. An interface module provides a user interface for identifying one or more facts of the objects in the set to present. A presentation module presents on the user interface a representation of the identified facts of the objects in the set, where the representation describes the attributes and corresponding values of the identified facts.

BRIEF DESCRIPTION OF THE DRAWINGS

FIG. 5 illustrates a UI including a tabular view of objects and facts according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

Figure 1:
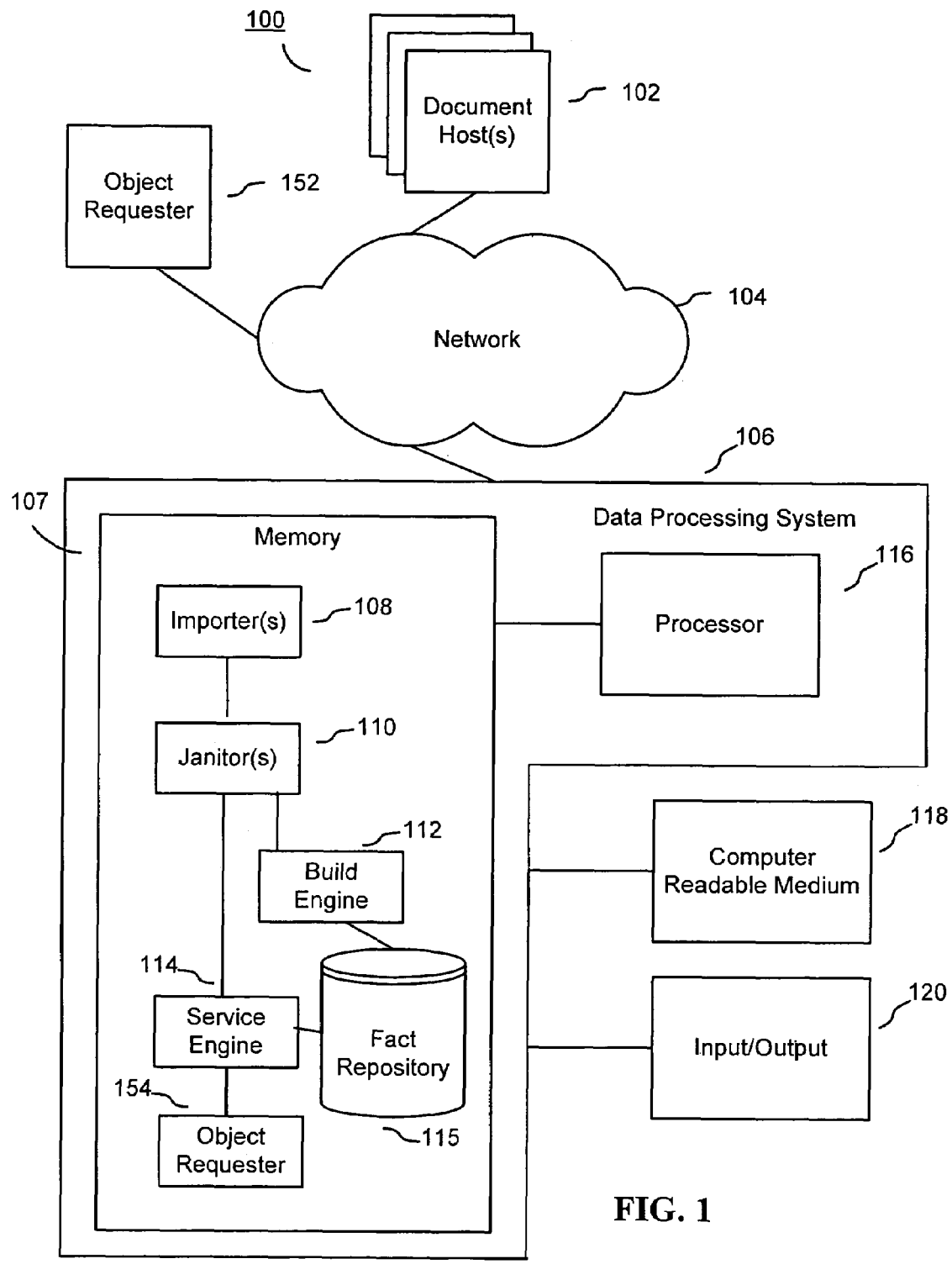
FIG. 1 shows a network, in accordance with a preferred embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in an markup language, such as Hypertext Markup Language (HTML), i.e., a web page, in a interpreted language (e.g., JavaScript) or in any other computer readable or executable format. A document can include one or more hyperliniks to other documents. A typical document will include one or more facts within its content. A document stored in a document host 102 may be located and/or identified by a Uniform Resource Locator (URL), or Web address, or any appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are entities that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
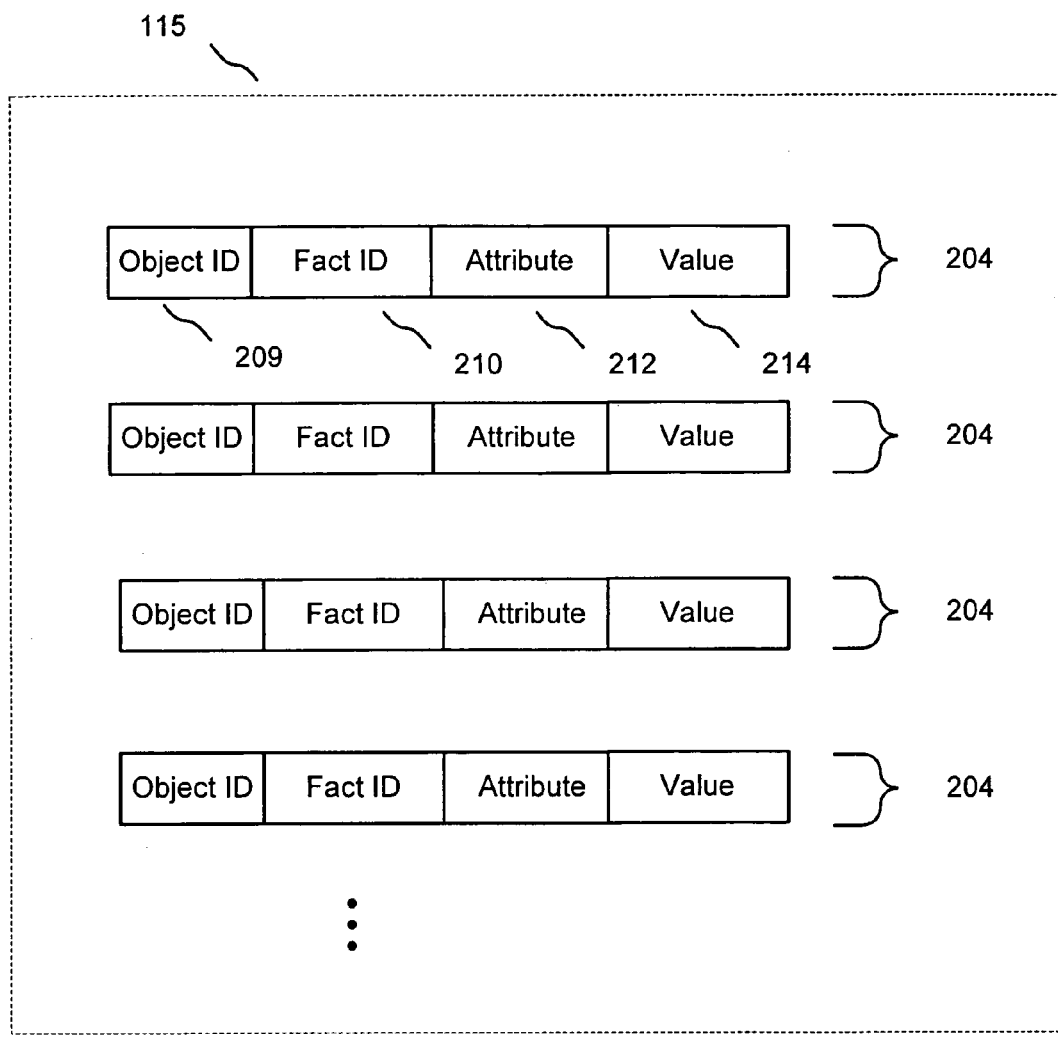
FIGS. 2(a)-2(d) are block diagrams illustrating a data structure for facts within a repository of FIG. 1 in accordance with preferred embodiments of the invention.

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
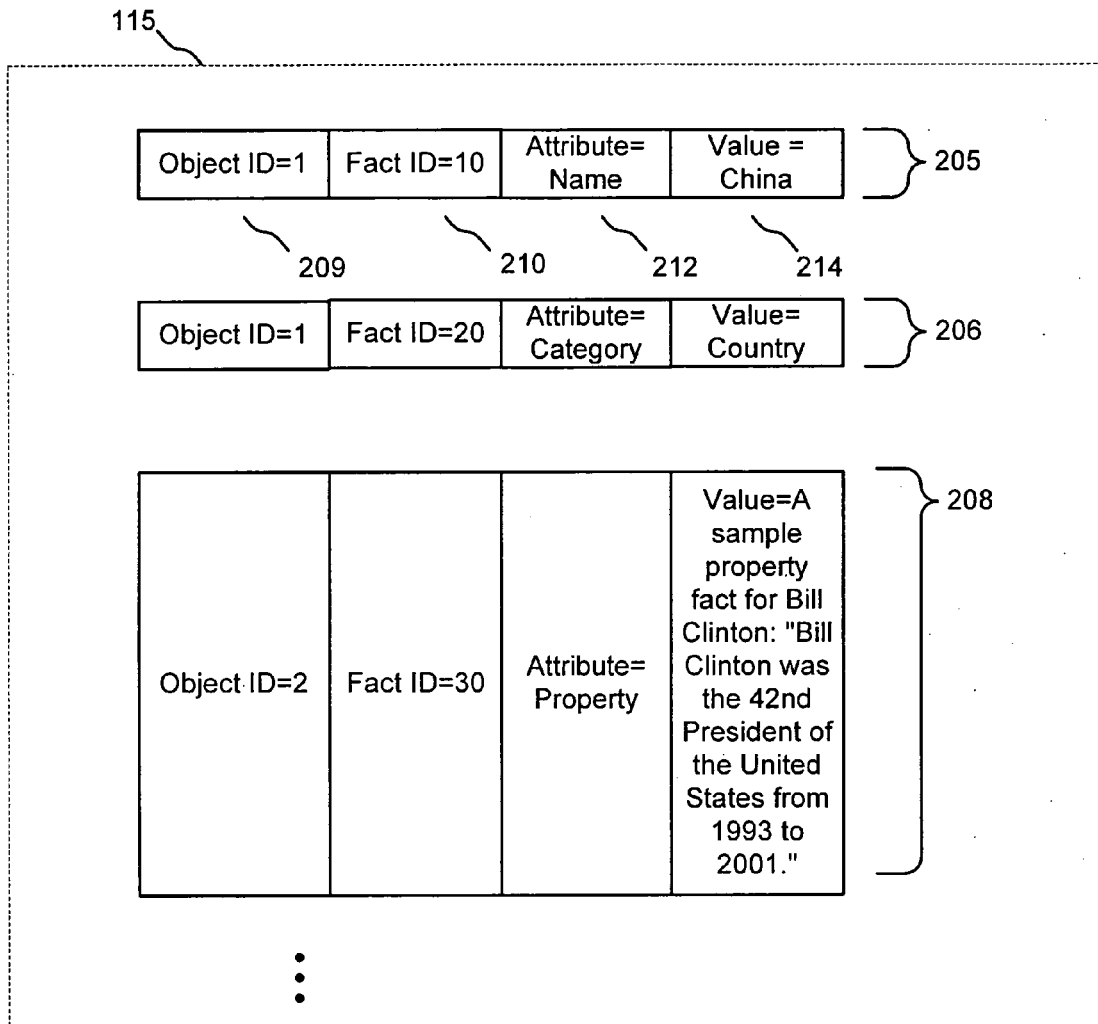

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2"has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
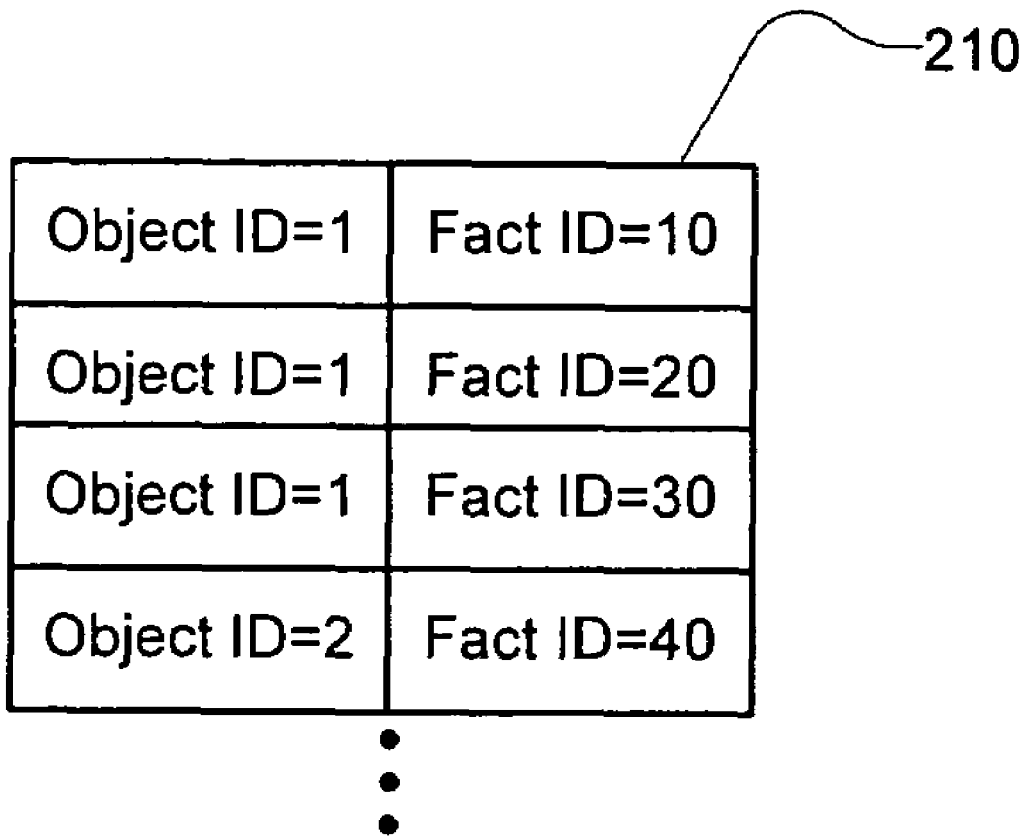

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
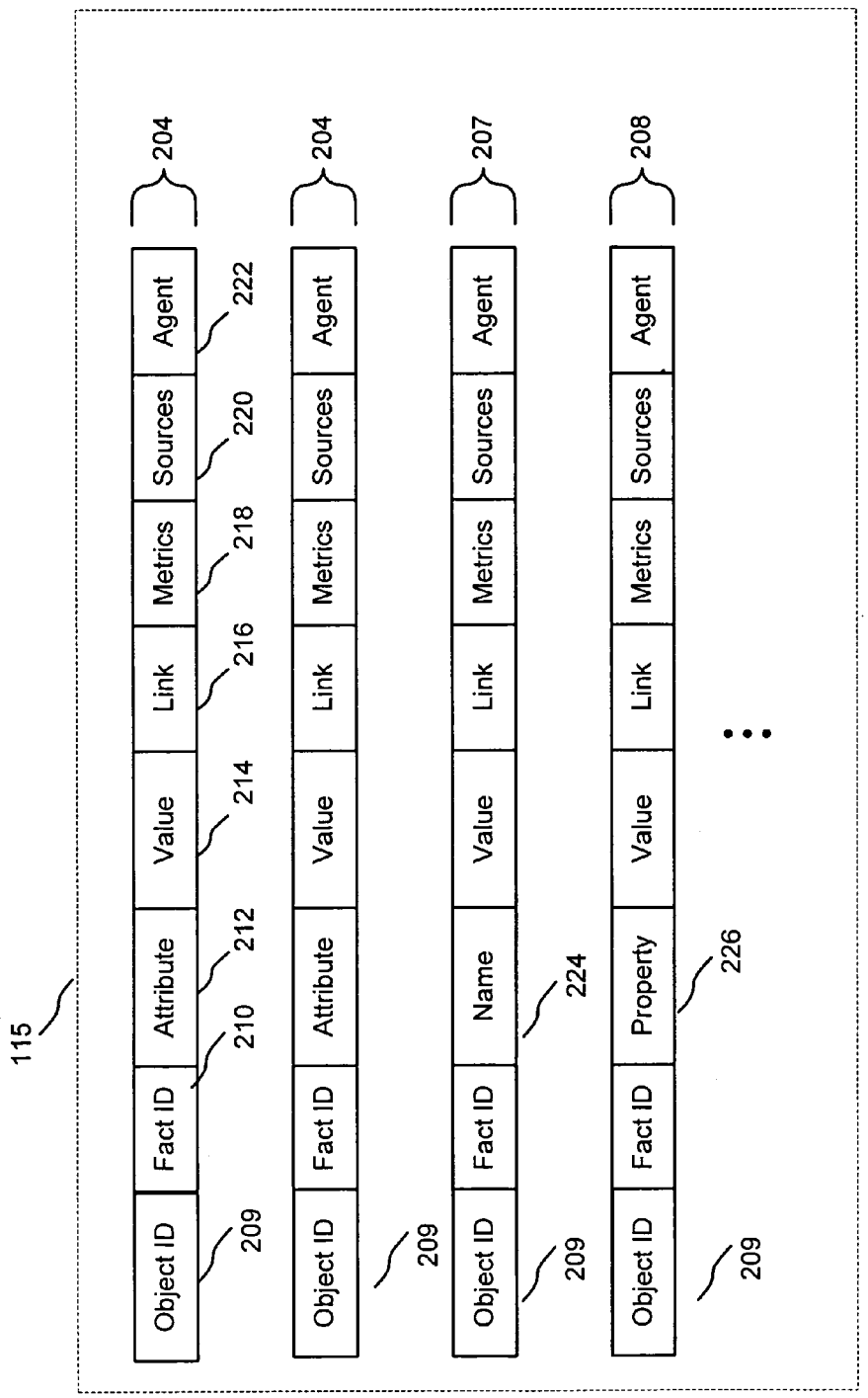

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of the some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
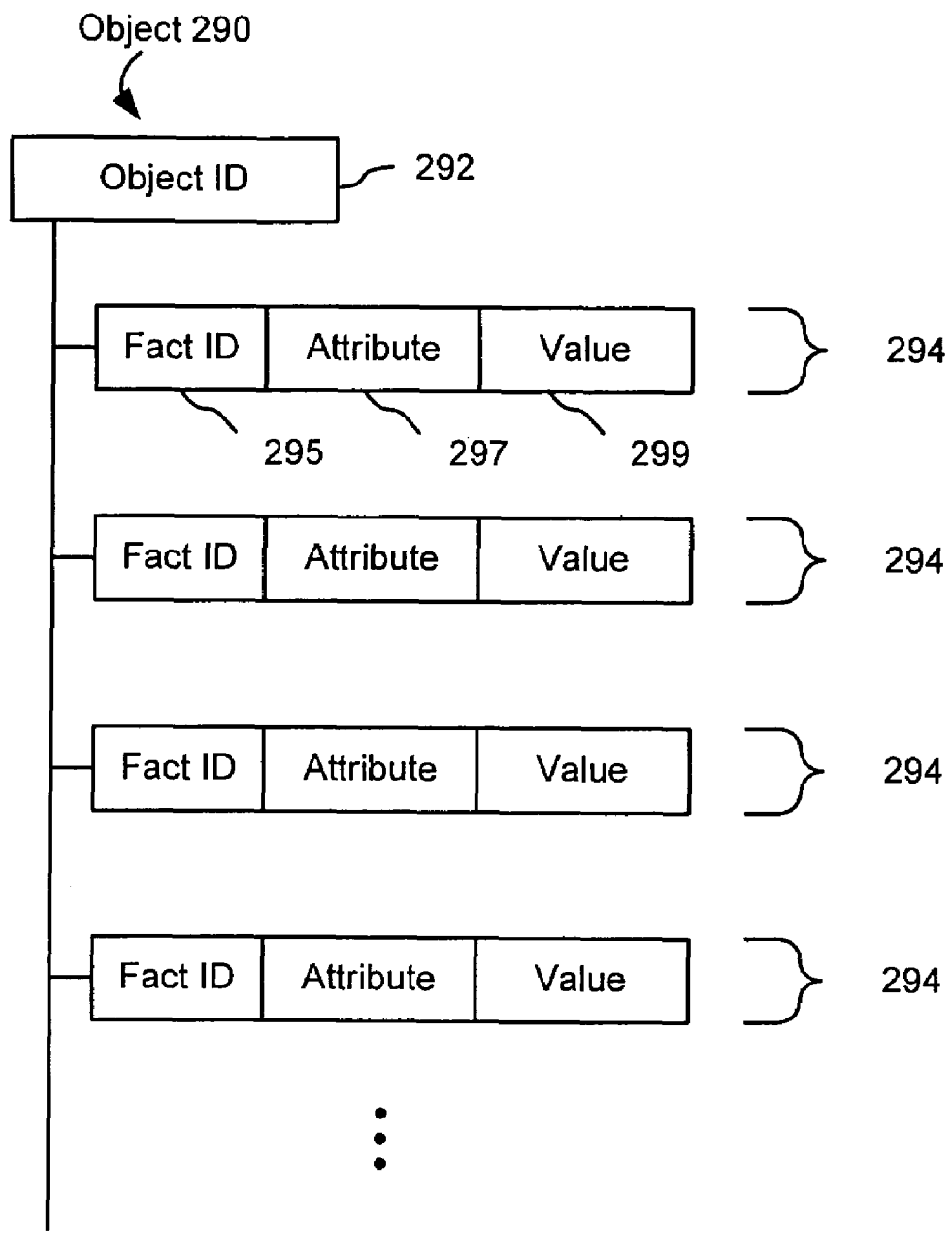
FIG. 2(e) is a block diagram illustrating an alternate data structure for facts and objects in accordance with preferred embodiments of the invention.

FIG. 2(e) is a block diagram illustrating an alternate data structure 290 for facts and objects in accordance with preferred embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3:
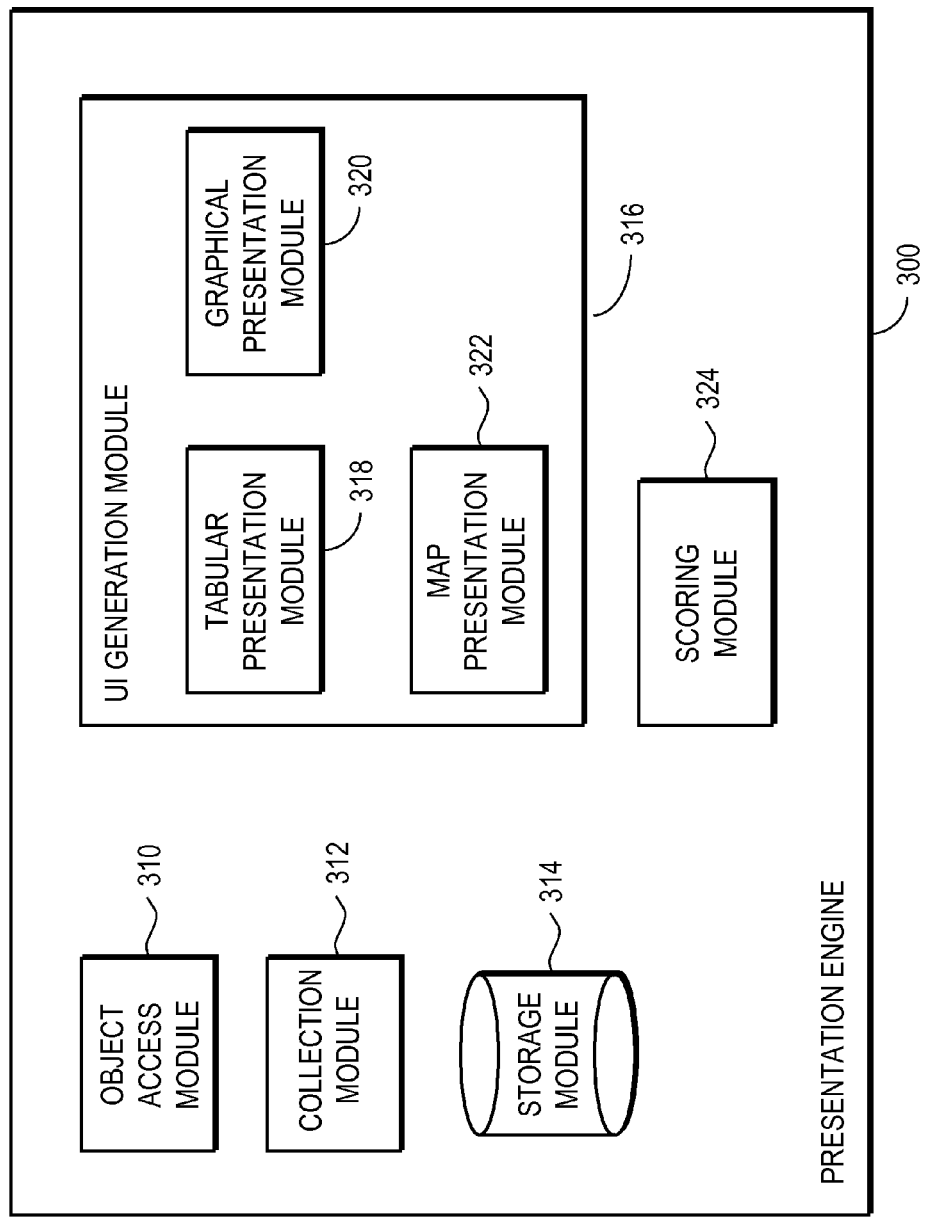
FIG. 3 is a high-level block diagram illustrating modules within a presentation engine according to one embodiment.

FIG. 3 is a high-level block diagram illustrating modules within a presentation engine 300 according to one embodiment. As used herein, the term "module" refers to computer program logic and/or data for providing the specified functionality. A module can be implemented in hardware, firmware, and/or software. Some embodiments have different and/or additional modules than those shown in FIG. 3. Moreover, the functionalities can be distributed among the modules in a different manner than described here.

A presentation engine 300 presents objects and facts in a customizable manner. That is, the presentation engine 300 provides flexible tools that enable an end-user to view the facts of one or more objects in ways desired by the end-user. The presentation engine 300 thus allows the end-user to view information in a way that is more comprehensible to the end-user.

In one embodiment, the modules of the presentation engine 300 are implemented as a JavaScript program that executes on client devices such as personal computers, cellular telephones, personal digital assistants (PDAs), etc. The JavaScript program interfaces with the data processing system 106 to access data and functionalities provided by it. The JavaScript program itself is controlled by a web browser, operating system, or other entity executing on the client device. In other embodiments, the presentation engine 300 is implemented using different coding techniques, relies solely on client-side data, and/or executes on the server.

An object access module 310 receives objects from the fact repository 115 and/or another source. In one embodiment, the objects are received in response to end-user interactions with a search engine or other object requester 152 that provides access to the fact repository 115. For example, an end-user can utilize a search engine to search the fact repository 115 for objects matching a particular query. The object requestor 152 returns a set of matching objects. A user interface provided by the object access module 310 and/or another module allows the end-user to select particular objects and designate the objects for further analysis. In this manner, the end-user can execute multiple different searches on the fact repository 115 and designate objects from the different searches for further analysis.

For example, assume that the fact repository 115 stores a set of objects of type "atomic element," including at least one object for each of the atomic elements. Also assume that the end-user executes a query for objects that match the phrase "atomic elements." The results of this query include all of the objects of type "atomic element" may also produce other objects depending upon the information in the objects and/or the search algorithms. The end-user can select one or more of these objects and designate the selected object for further analysis. For purposes of this example, assume that the end-user designates each one object for each atomic element.

In another embodiment, the object access module 310 receives the objects from the end-user. For example, the end-user can supply user defined objects for use with the presentation engine 300. Further, the end-user can encounter objects on the network 104 at locations other than the fact repository 115, such as on web pages not associated with the repository, and cause the object access module 310 to supply those objects to the presentation engine 300.

In one embodiment, a collection module 312 receives the objects designated for further analysis by the end-user. The collection module 312 stores multiple collections, and each collection stores zero or more objects. In one embodiment, the end-user specifies the collection in which the collection module 312 stores the designated objects. In other embodiments, the collection module 312 stores designated objects in a default collection if the end-user does not specify a particular collection. The collection module 312 provides an interface allowing the end-user to manipulate the collections and the objects within the collections. For example, the end-user can view the objects within different collections, and add and remove objects.

Although most of this discussion focuses on a collection containing objects for the atomic elements, a collection can hold arbitrary and heterogeneous objects. For example, a collection can contain objects for the atomic elements, the actor M. Emmet Walsh, and the country China. Some heterogeneous objects may have attributes in common, while other objects might not have any common attributes.

A storage module 314 stores the collections and/or other data utilized by the presentation engine 300 for its operation. The storage module 314 acts as a place where other modules in the presentation engine 300 can store and retrieve information. In one embodiment, the storage module 314 is a logical construct that uses storage allocated from virtual memory on the client device on which the presentation engine 300 is executing. In other embodiments, some or all of the storage provided by the storage module 314 is located on a server connected to the client via the network 104. For example, the collection module 312 can store collections in the storage module 314. The storage module 314 stores the data describing the collections and references to the objects within the collections in a memory on the client. However, the objects themselves are stored on a server accessible via the network 104 and retrieved from the server when necessary or desired.

A user interface (UI) generation module 316 generates a UI for the end-user. Generally, the UI allows the end-user to view and manipulate the objects and the facts within the objects. In addition, the UI allows the end-user to control other aspects of the presentation engine 300, such as executing a search for new objects and designating objects for storage in a collection. In one embodiment, the UI is displayed on a display device of the client and contains buttons, list boxes, text boxes, images, hyperlinks, and/or other tools with which the end-user can control the presentation engine.

In one embodiment, the UI generation module 316 includes other modules for generating specific UI elements. These modules include a tabular presentation module 318 that generates UI elements displaying objects and facts in tables. Further, the UI generation module 316 includes a graphical presentation module 320 for displaying objects and facts in graphs. Additionally, the UI generation module includes a map presentation module 322 that displays objects and facts in combination with maps. The UI elements provided by these modules are described in more detail below.

A scoring module 324 evaluates objects, attributes, and values and outputs corresponding scores. These scores can be used to produce ranked lists of objects and/or facts. The factors utilized for the evaluations and scores depend upon the embodiment and the objects, attributes, and/or values being evaluated. In one embodiment, the presentation engine 300 uses the scores produced by the scoring module 324 to establish facts to show in certain UIs. The operation of the scoring module 324 is described in more detail below.

Figure 4:
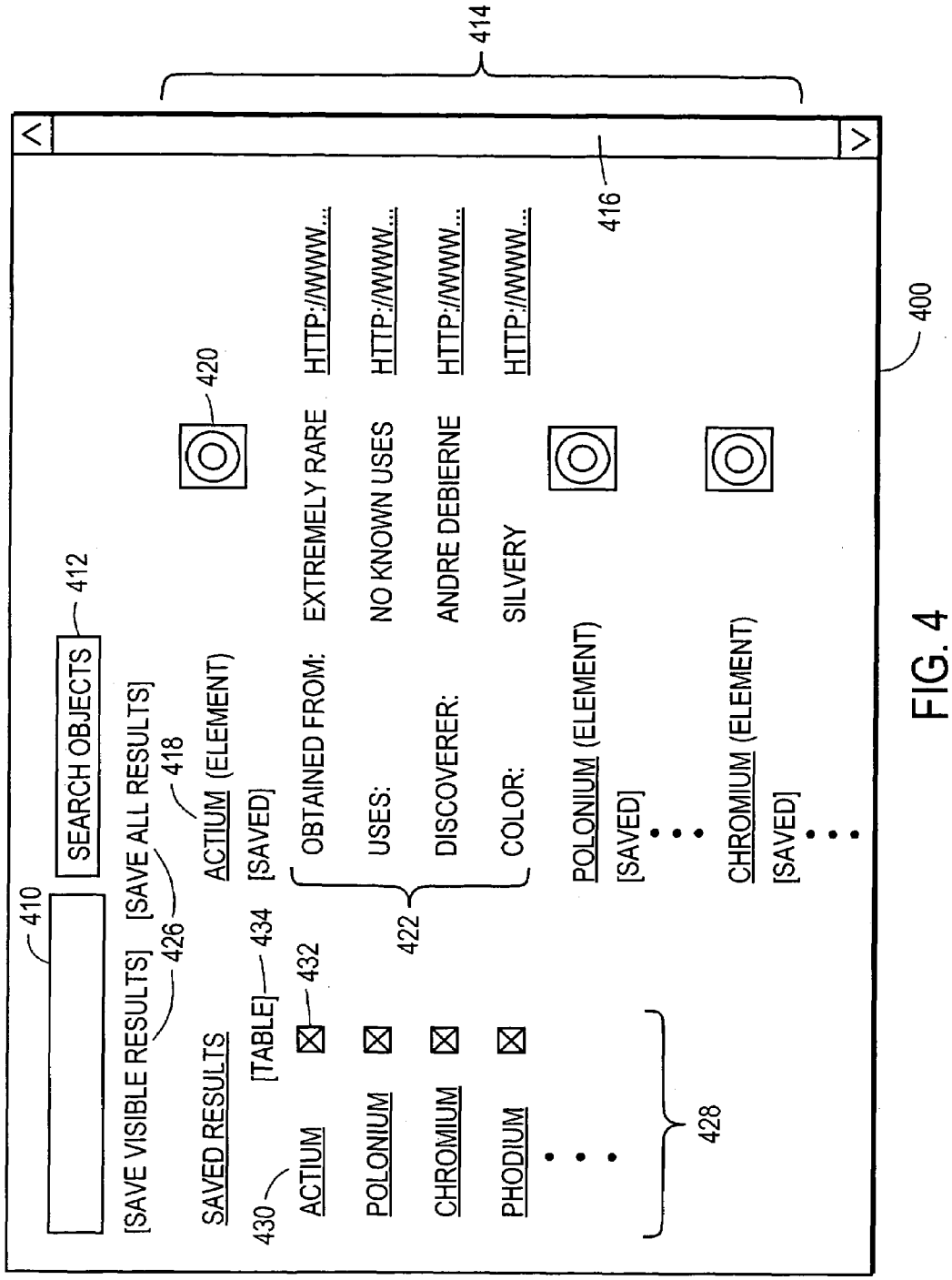
FIG. 4 illustrates a user interface (UI) contained on a web page generated by the UI generation module according to one embodiment.

FIG. 4 illustrates a UI 400 contained on a web page generated by the UI generation module 316 according to one embodiment. User interfaces generated by other embodiments have different and/or additional elements than the interface of FIG. 4. Moreover, the UI elements can be arranged in a different manner than is shown in the figure. Although not specifically discussed below, many of the elements of the UI are hyperlinks that the end-user can select to access additional information. FIG. 4 and the other figures illustrating UIs show exemplary interfaces where the end-user has searched for, and is viewing, objects for the atomic elements.

The UI 400 of FIG. 4 is utilized by the end-user to search for facts and/or objects matching a particular search query and to save designated objects in a collection. In addition, the end-user can use the UI 400 to view facts about the objects. To this end, the top of the UI 400 contains a text input box in which the end-user can provide a textual description of the search query (e.g., keywords to search) and a button 412 the end-user can select to execute the search.

A results area 414 below the search text input box 410 displays objects that match the search query. In the illustrated embodiment, the results area 414 displays the names of the objects and a few facts about each object. The UI 400 includes a scroll bar 416 with which the end-user can view objects that are lower on the page.

In the illustrated UI 400, the results area 414 shows the objects for the elements Actinium, Polonium, and Chromium. The names 418 of the elements are displayed, along with images 420 that illustrate the respective elements. Beneath each name 418 is a set of facts 422 about the element. The illustrated UI shows four facts 422 about each element, although other embodiments can show fewer or more facts. For example, for the element Actinium the displayed facts 422 are:

| Obtained From: | extremely rare |
|---|---|
| Uses: | No uses known |
| Discoverer: | Andre Debierne |
| Color: | Silvery |

In addition, each displayed fact includes a URL that links to the source page from which the fact was derived.

The initial facts displayed for an object are determined based on scores produced by the scoring module 324. The scoring module 324 calculates scores for the facts of the object based on the metric (e.g., the importance and confidence levels) and outputs a ranked list. Facts having high importance and confidence are generally ranked higher than facts having low importance and/or confidence. In one embodiment, the rankings produced by the scoring module 324 are influenced by the search query utilized to produce the list of objects. The scoring module 324 can increase the importance component of a fact if that fact matches a search term. For example, a search query for "atomic element weight" will produce an increased importance for the "atomic weight" fact of an object, and likely result in the atomic weight fact being ranked high enough to appear on the UI 400.

Each displayed object 418 includes a button 424 that the end-user can select to save the object to a collection. In addition, other buttons 426 on the UI 400 provide the end-user with the options of saving all search results to a collection or saving only visible results to the collection. The collection 428 itself is displayed in a column on the left side of the UI 400. The names of the objects 430 in the collection are displayed, along with a check box with which the end-user can remove the objects from the collection 428.

The illustrated UI 400 includes a "table" button 434 near the collection display. When this button 434 is selected by the end-user, the UI 400 presents a tabular view of the objects in the collection. This tabular view is produced by the tabular presentation module 318. Other embodiments of the presentation engine 300 provide other ways to access the table functionality.

FIG. 5 illustrates a UI 500 including a tabular view 510 of objects and facts according to one embodiment. The illustrated table 510 contains four columns and a row for every object. The leftmost column 512 lists the names of the objects, which in this case are the atomic elements (Actinium, Polonium, Chromium . . . ). The columns to the right 514 display attributes of the objects. In FIG. 5, the attributes displayed are the atomic masses, densities, and boiling points of the respective elements.

The tabular presentation module 318 uses the scoring module 324 to select the initial attributes for the right-side columns 514 of the table 510. In one embodiment, the scoring module 324 identifies the most common attributes of the objects in the collection 428, and produces a list of the attributes sorted by commonality. Thus, an attribute shared by all of the objects in the collection 428 is ranked first in the list, while an attribute possessed by only one of the objects is ranked last. In one embodiment, the metrics associated with the attributes' facts are used to break ties. The tabular presentation module 318 shows the highest ranked attributes in the initial columns 514 of the table 510.

A drop down selection box 516 displayed near the top of the table 510 allows the end-user to select additional facts to include in the table. In one embodiment, the selection box 516 contains every unique attribute from the objects in the collection 428. The end-user can select one of the attributes, and in response the UI 500 adds a column to the table showing the values of the objects for the selected attribute. In one embodiment, the new column is made the rightmost column of the table 510. If an object lacks the attribute displayed in the table 510, one embodiment displays a blank space, text indicating that the attribute is not applicable, or another indicator that the object lacks the attribute.

The columns 514 of the table 500 displaying facts contain additional buttons allowing the end-user to manipulate the table. In one embodiment, each column contains buttons 518 labeled "Remove," "Sort," and "Graph." The "Remove" button, when selected, removes the specified column from the table 510. If the "Sort" button is selected, the table is resorted based on the values of the attribute represented by the specified column. For example, choosing the "Sort" button of the "Density" column causes the table 510 to resort the atomic elements based on their densities.

When the "Graph" button is selected by the end-user, the UI 500 presents a graphical view of the objects in the collection. This graphical view is produced by the graphical presentation module 320. Specifically, the UI 500 presents a graph showing the objects' values for the attribute of the column selected by the end-user.

The graphical presentation module 320 determines the type of graph that best facilitates interpretation of the facts by the end-user and automatically generates a graph of that type. In one embodiment, graphical presentation module 320 considers the type of facts being graphed in determining the initial graph type. One consideration is the format of the value for the fact being graphed, e.g., whether the value is represented by a number, text, graphic, sound, etc. Another consideration is the meaning of the fact, e.g., is it a date, name, location, quantity, temperature, etc. In one embodiment, the graphical presentation module 320 determines the meaning of a fact from data within the object. For example, the meaning can be explicitly specified by meta-data within the object or can be derived from the name of the attribute associated with the fact.

The specific types of graphs that the graphical presentation module 320 produces can vary depending upon the embodiment and/or the values being graphed. In one embodiment, the module 320 graphs facts that are dates on a timeline. A timeline facilitates the interpretation of dates such as dates of births, deaths, disasters, discoveries and the like.

In one embodiment, the graphical presentation module 320 uses maps to graph facts that are locations because maps represent a good way to facilitate the understanding of such facts. The graphical presentation module 320 interacts with a map presentation module 322 to produce the maps. In one embodiment, the map presentation module 322 holds maps of geographic regions. The facts of objects specify geographic locations, such as countries, places of births and death, etc. either explicitly (e.g., latitude/longitude) or implicitly (e.g., by name). The graphical presentation module 320 uses the maps and facts to produce maps that illustrate the locations specified by the facts. For example, an end-user can execute a search on "volcanoes" and create a collection that stores objects representing volcanoes. Each of these volcano objects includes a fact that describes the volcano's location. The end-user can use the graphical presentation module 320 and map presentation module 322 to create a map that shows the locations of the volcanoes using push pins or other icons. Similarly, the end-user can create a collection of NBA basketball players, and then create a map showing the place of birth of each one.

Other embodiments of the graphical presentation module 320 graph other types of facts using other specialized graphs. In one embodiment, if the values of the attributes are numeric and are not of a type having a specialized graph, the graphical presentation module 320 produces a bar graph showing the value of the attribute for each object. If the values are not numeric, the graphical presentation module 320 produces a histogram grouping objects having the same value for the attribute. In either case, the graph shows the attribute along the X-axis. In one embodiment, the graphical presentation module 320 shows the graph as a scatter plot if two attributes are being graphed simultaneously.

Figure 6:
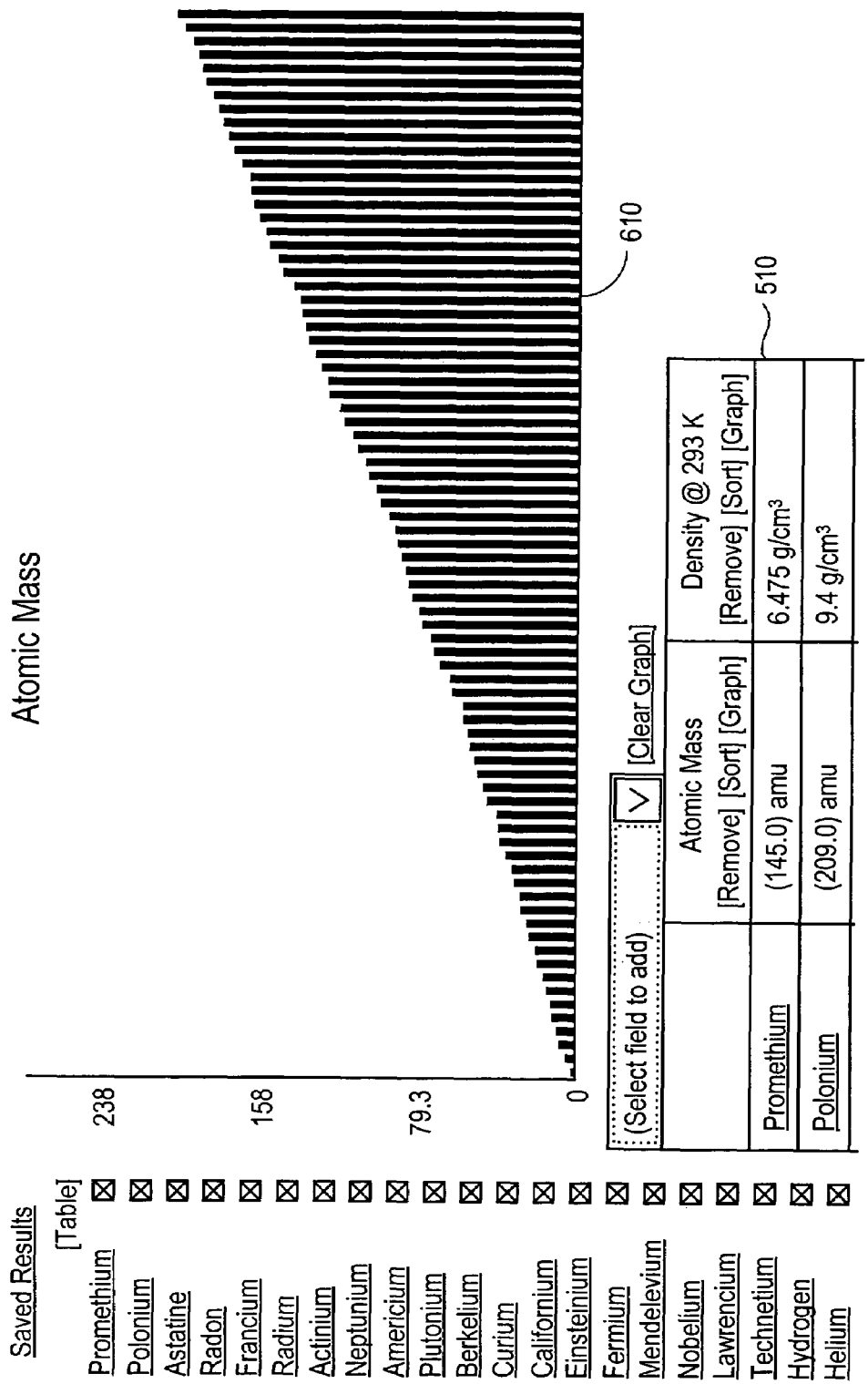
FIG. 6 illustrates a UI including a graphical view of objects and facts according to one embodiment.

FIG. 6 illustrates a UI 600 including a graphical view 610 of objects and facts according to one embodiment. Specifically, FIG. 6 illustrates the graph 610 produced by the graphical presentation module 320 when the end-user selects the "graph" button for the "Atomic Mass" attribute. The graph 610 is a bar graph, with each bar representing one object (i.e., atomic element) and the height of the bar representing the value of that object's "Atomic Mass" attribute.

As shown in FIG. 6, the UI 600 illustrates the table 510 of objects in addition to the graph 610. In one embodiment, the end-user can use the "Sort" and "Graph" buttons to update the graph. If the end-user selects the "Sort" button for a column, the graphical presentation module 320 resorts the graph (if necessary), based on the selected attribute. The end-user can sort the graph based on an attribute that is not displayed in the graph. For example, the end-user can select the "Sort" button for the "Density" field and sort the graph of atomic masses by the objects' densities, so that the leftmost bar on the X-axis of the graph shows the atomic mass of the element having the lowest (or highest) density.

The end-user can use the "Graph" buttons to add or remove attributes from the graph 610. When an attribute is shown in the graph 610, its corresponding "Graph" button becomes a "No Graph" button. The end-user selects the "No Graph" button to remove the attribute from the graph. If an attribute shown in the table 510 is not displayed on the graph 610, the end-user can select that attribute's "Graph" button and cause the attribute to be graphed.

Figure 7:
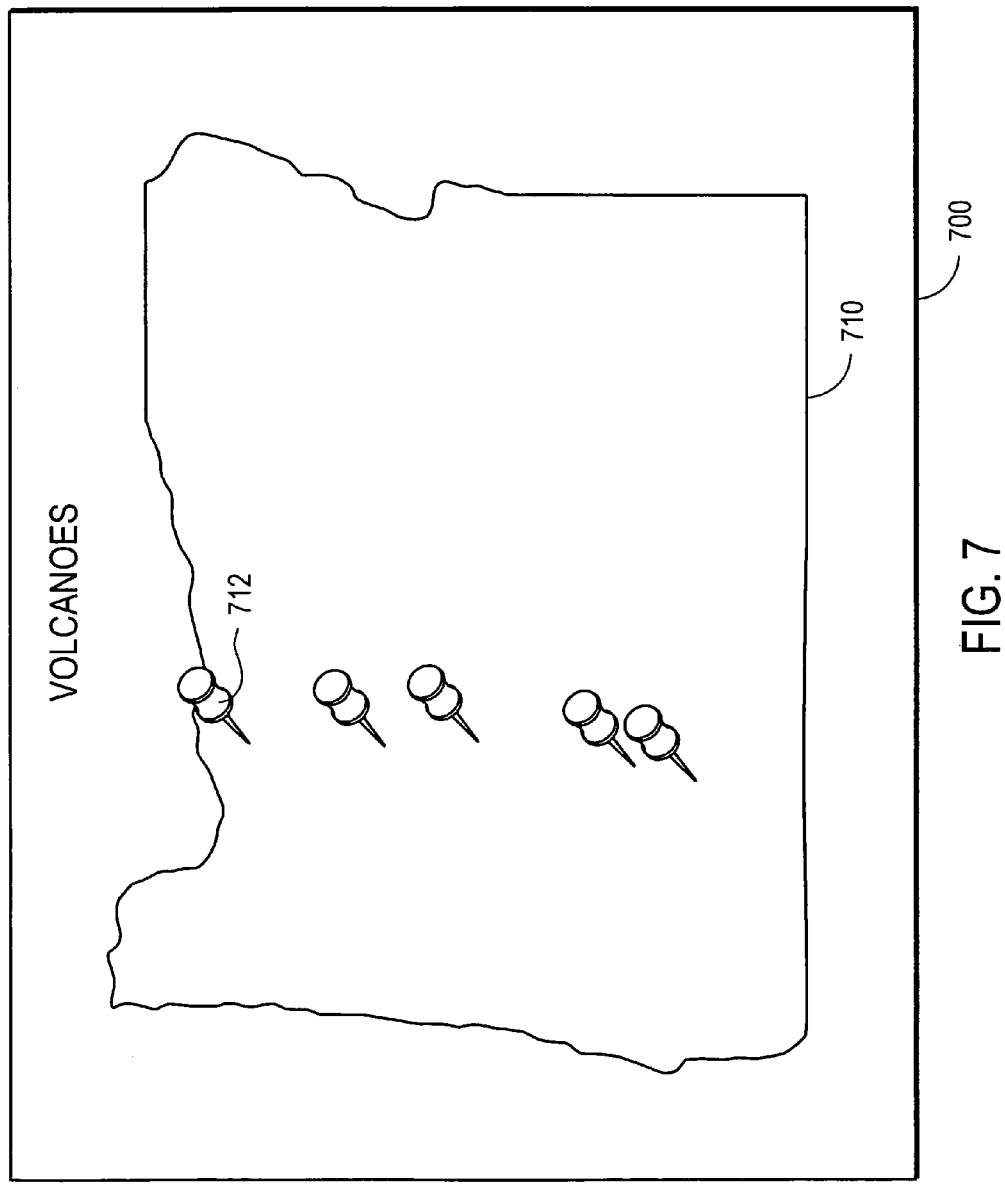
FIG. 7 illustrates an example of a map produced by the graphical presentation module and map presentation module according to one embodiment.

FIG. 7 illustrates an example of a map 700 produced by the graphical presentation module 320 and map presentation module 322 according to one embodiment. The map 700 shows potentially active volcanoes in the state of Oregon. The map illustrates the border 710 of the state, and shows five push pins 712 representing the locations of the volcanoes within Oregon.

In one embodiment, the end-user can obtain additional information about a graphed object by using a mouse or other pointing device to move a cursor over the graphical representation of the object. For example, if the end-user moves the cursor over a particular bar of a bar graph, the graphical presentation module 320 displays additional facts about the object. Similarly, the end-user can move the cursor over a push pin icon on a map to view additional facts about the object having the location identified by the push pin.

Figure 8:
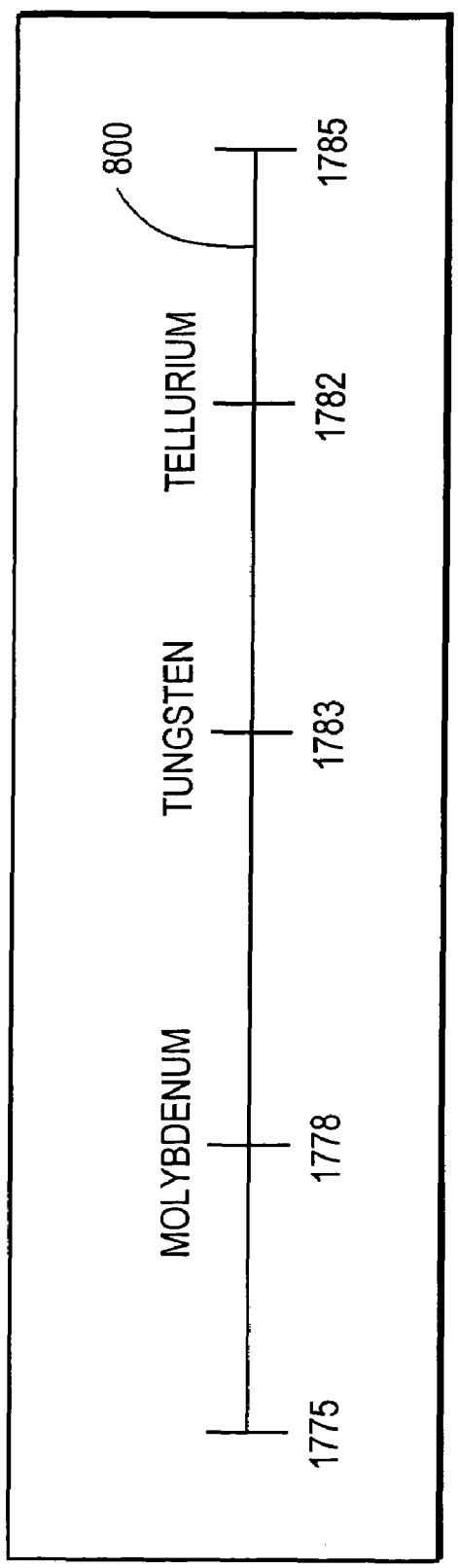
FIG. 8 illustrates an example of a timeline produced by the graphical presentation module according to one embodiment.

FIG. 8 illustrates an example of a timeline 800 produced by the graphical presentation module 320 according to one embodiment. The timeline 800 illustrates the period between 1775 and 1785 and shows the atomic elements discovered within that period. Thus, the timeline 800 shows that molybdenum was discovered in 1778, tungsten was discovered in 1783, and tellurium was discovered in 1782.

Figure 9:
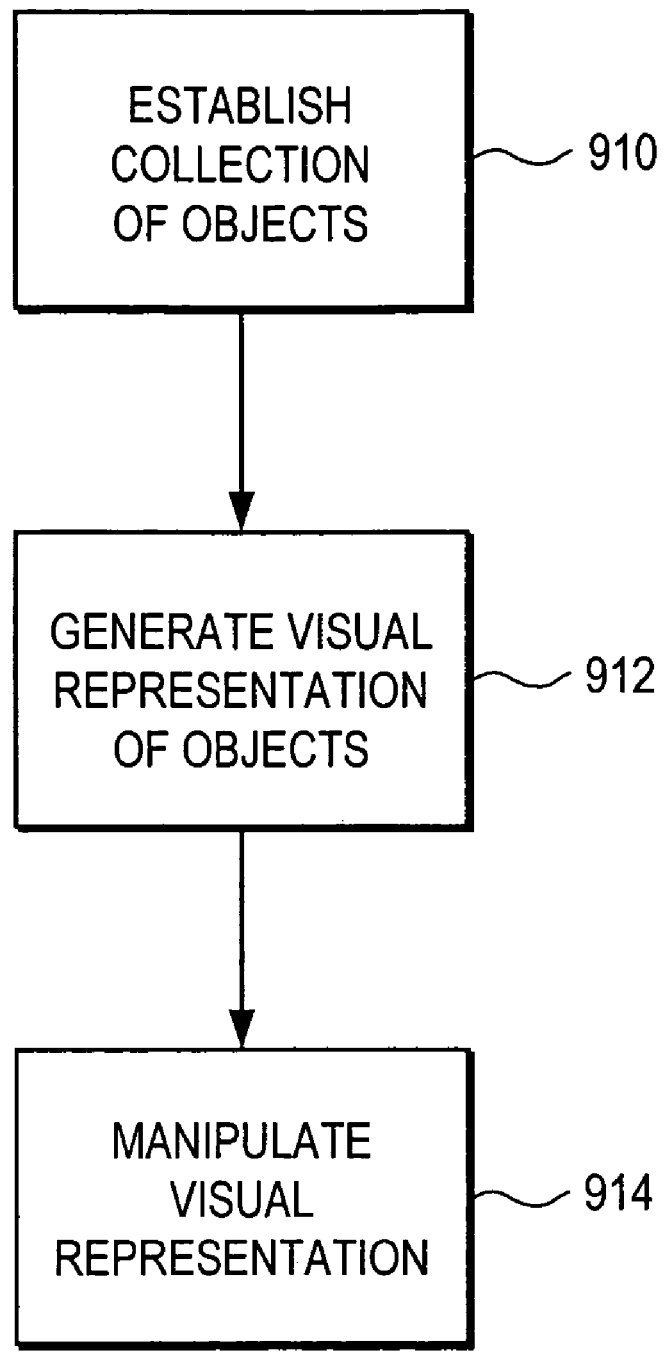
FIG. 9 is a flow chart illustrating steps performed by the presentation engine according to one embodiment.

FIG. 9 is a flow chart illustrating steps performed by the presentation engine 300 according to one embodiment. Other embodiments perform the steps in different orders and/or perform different or additional steps than the ones shown in FIG. 9. This description describes the steps as occurring through interactions with an end-user. In other embodiments, the steps can be performed through automated processes.

Initially, the presentation engine 300 establishes 910 a collection of objects. This collection is typically established when an end-user interacts with the presentation engine 300, a search engine, and/or other entities to view a list of objects. The end-user selects certain objects and designates them for further analysis. The presentation engine 300 stores the designated objects in a collection or other logical grouping.

The end-user interacts with the presentation engine 300 to generate 912 a visual representation of the designated objects. For example, the end-user can use a UI presented by the presentation engine 300 to generate a table showing facts of the objects. Likewise, the end-user can cause the presentation engine 300 to generate graphs, timelines, and maps showing facts of the objects. Further, the end-user can manipulate 914 the visual representation by adding columns to a table, sorting the values shown by a graph, moving a cursor over a push pin icon on a map, etc. Using the presentation engine 300, the end-user can thus view the facts of the objects in a manner that is beneficial to the end-user, rather than being forced to use the presentation selected by the entity that initially provided the objects and/or facts.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A computer-based system for presenting facts, comprising:
    an object access module adapted to establish a set of objects in response to a search query received from a user, each object having a set of facts stored in a computer memory containing information about an entity associated with the object, each fact having an attribute indicating a property of the entity and a corresponding value describing the indicated property;
    an interface module adapted to provide a user interface for allowing the user to identify one or more facts of the objects in the set to present and for allowing the user to manipulate a representation of the identified facts; and
    a presentation module for presenting via the user interface the representation of the identified facts of the objects in the set, the representation describing the attributes and corresponding values of the identified facts.

2. The system of claim 1, further comprising:
    a fact repository adapted to store a collection of objects;
    wherein the object access module establishes the set of objects responsive to a query executed against the collection of objects in the fact repository.

3. The system of claim 2, wherein the object access module establishing the set of objects comprises the object access module receiving a designation of one or more objects returned in response to the query executed against the collection of objects in the fact repository.

4. The system of claim 1, wherein a fact has an associated metric and further comprising:
    a scoring module adapted to produce scores for the facts responsive to the facts' metrics;
    wherein the presentation module is further adapted to present representations of facts responsive to the facts' scores.

5. The system of claim 4, wherein a metric comprises:
    a confidence level indicating a likelihood that the fact is correct; and
    an importance value indicating a relevance of the fact to its associated object.

6. The system of claim 1, further comprising:
    a scoring module adapted to determine a commonality of the attributes of the objects in the set;
    wherein the presentation module is further adapted to present representations of facts responsive to the attributes' commonality.

7. The system of claim 1, wherein the presentation module comprises:
    a tabular presentation module adapted to generate a table describing the identified facts of the objects in the set.

8. The system of claim 7, wherein the interface module is further adapted to provide a user interface enabling an end-user to selectively indicate which facts of the objects the tabular presentation module includes in the table.

9. The system of claim 1, wherein the presentation module comprises:
    a graphical presentation module adapted to generate a graph describing the identified facts of the objects in the set.

10. The system of claim 9, wherein the graphical presentation module is further adapted to determine a type of graph to generate responsive to a value of an identified fact.

11. The system of claim 9, wherein the graph describes values of the identified facts in an order, and wherein the order is selected responsive to values of a fact not described in the graph.

12. The system of claim 1, wherein a fact of an object comprises a date and wherein the presentation module is further adapted to generate a timeline displaying the date of the fact.

13. A computer program product having a computer-readable medium having computer program instructions embodied therein for presenting facts, the computer program instructions comprising:
    an object access module adapted to establish a set of objects in response to a search query received from a user, each object having a set of facts stored in a computer memory containing information about an entity associated with the object, each fact having an attribute indicating a property of the entity and a corresponding value describing the indicated property;
    an interface module adapted to provide a user interface for allowing the user to identify one or more facts of the objects in the set to present and for allowing the user to manipulate a representation of the identified facts; and a presentation module for presenting via the user interface the representation of the identified facts of the objects in the set, the representation describing the attributes and corresponding values of the identified facts.

14. The computer program product of claim 13, further comprising:
a fact repository adapted to store a collection of objects;
wherein the object access module establishes the set of objects responsive to a query executed against the collection of objects in the fact repository.

15. The computer program product of claim 13, wherein a fact has an associated metric and further comprising:
a scoring module adapted to produce scores for the facts responsive to the facts' metrics;
wherein the presentation module is further adapted to present representations of facts responsive to the facts' scores.

16. The computer program product of claim 15, wherein a metric comprises:
a confidence level indicating a likelihood that the fact is correct; and
an importance value indicating a relevance of the fact to its associated object.

17. The computer program product of claim 13, further comprising:
a scoring module adapted to determine a commonality of the attributes of the objects in the set;
wherein the presentation module is further adapted to present representations of facts responsive to the attributes' commonality.

18. The computer program product of claim 13, wherein the presentation module comprises:
a tabular presentation module adapted to generate a table describing the identified facts of the objects in the set.

19. The computer program product of claim 18, wherein the interface module is further adapted to provide a user interface enabling an end-user to selectively indicate which facts of the objects the tabular presentation module includes in the table.

20. The computer program product of claim 18, wherein the presentation module comprises:
a graphical presentation module adapted to generate a graph describing the identified facts of the objects in the set.

21. The computer program product of claim 20, wherein the graphical presentation module is further adapted to determine a type of graph to generate responsive to a value of an identified fact.

22. The computer program product of claim 20, wherein the graph describes values of the identified facts in an order, and wherein the order is selected responsive to values of a fact not described in the graph.

23. The computer program product of claim 13, wherein a fact of an object comprises a date and wherein the presentation module is further adapted to generate a timeline displaying the date of the fact.

24. A computer-implemented method of presenting facts, comprising:
at a client computer system comprising a processor, memory, and a display device,
establishing a set of objects in response to a search query received from a user, each object having a set of facts stored in the memory containing information about an entity associated with the object, each fact having an attribute indicating a property of the entity and a corresponding value describing the indicated property;
identifying one or more facts of the objects in the set to present;
presenting a visual representation of the identified facts of the objects in the set on the display device, the representation describing the attributes and corresponding values of the identified facts; and
manipulating the representation of the identified facts displayed on the display device in response to input from the user.

25. The method of claim 24, further comprising:
executing a query against a repository storing a collection of objects to identify a set of objects satisfying the query.

26. The method of claim 24, wherein a fact has an associated metric and further comprising:
scoring the facts responsive to the facts' metrics to produce scores for the facts; and
identifying the one or more facts of the objects in the set to present responsive to the facts' scores.

27. The method of claim 26, wherein a metric comprises:
a confidence level indicating a likelihood that the fact is correct; and
an importance value indicating a relevance of a fact to its associated object.

28. The method of claim 24, further comprising:
identifying a commonality of the attributes of the objects in the set; and
identifying the one or more facts of the objects in the set to present responsive to the commonality of the attributes.

29. The method of claim 24, the presenting further comprises:
presenting a table describing the identified facts of the objects in the set.

30. The method of claim 29, further comprising:
providing a user interface enabling an end-user to selectively indicate which facts of the objects to include in the table.

31. The method of claim 24, wherein the presenting further comprises:
generating a graph describing the identified facts of the objects in the set.

32. The method of claim 31, wherein the presenting further comprises:
determining a type of graph to generate responsive to a value of an identified fact.

33. The method of claim 31, wherein the graph describes values of the identified facts in an order, and further comprising:
ordering the values of the identified facts in an order generated responsive to values of a fact not described in the graph.

34. The method of claim 24, wherein a fact of an object comprises a date and wherein the presenting further comprises:
generating a timeline displaying the date of the fact.

35. A computer-implemented method of presenting facts of objects stored in a fact repository, comprising:
at a client computer system comprising a processor, memory, and a display device,
establishing a collection of objects responsive to at least one query to the fact repository initiated by a user, each object in the collection having a set of facts stored in the memory containing information about an entity associated with the object, each fact having an attribute indicating a property of the entity and a corresponding value describing the indicated property;

receiving input from the user identifying one or more facts of the objects in the collection to present in a visual manner;

providing the user with a visual representation of the identified facts of the objects on the display device, the visual representation describing the attributes and corresponding values of the identified facts; and manipulating the representation of the identified facts displayed on the display device in response to input from the user.

36. The method of claim 35, wherein providing the user with a visual representation comprises:

generating a graphical representation that emphasizes distinctions between facts of different objects.

37. The method of claim 36, wherein a fact is comprised of an attribute and a value, wherein multiple objects possess a same attribute, and wherein the graphical representation emphasizes distinctions between different values of an attribute possessed by multiple objects.

* * * * *